(12) United States Patent
Yoshimune et al.

(10) Patent No.: US 8,303,690 B2
(45) Date of Patent: Nov. 6, 2012

(54) HOLLOW FIBER CARBON MEMBRANE AND METHOD FOR PRODUCTION THEREOF

(75) Inventors: Miki Yoshimune, Tsukuba (JP); Kenji Haraya, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 294 days.

(21) Appl. No.: 12/671,003

(22) PCT Filed: Jul. 31, 2008

(86) PCT No.: PCT/JP2008/063731
§ 371 (c)(1),
(2), (4) Date: Jan. 27, 2010

(87) PCT Pub. No.: WO2009/017185
PCT Pub. Date: Feb. 5, 2009

(65) Prior Publication Data
US 2010/0212503 A1    Aug. 26, 2010

(30) Foreign Application Priority Data
Aug. 2, 2007 (JP) .................................. 2007-201865

(51) Int. Cl.
*B01D 53/22* (2006.01)
(52) U.S. Cl. .................. 96/10; 95/43; 95/45; 96/7; 96/8
(58) Field of Classification Search ................ 95/43, 45; 96/8, 10, 7
See application file for complete search history.

(56) References Cited

U.S. PATENT DOCUMENTS
5,171,735 A * 12/1992 Chien ........................... 505/430
(Continued)

FOREIGN PATENT DOCUMENTS
JP   64-055383   3/1989
JP   04-193334   7/1992
(Continued)

OTHER PUBLICATIONS
Machine translation of JP 2006-231095, 2006.*
Machine translation of JP 05-220360, 1993.*

*Primary Examiner* — Jason M Greene
*Assistant Examiner* — Anthony Shumate
(74) *Attorney, Agent, or Firm* — J.C. Patents

(57) ABSTRACT

A hollow fiber carbon membrane is provided, which has excellent gas separation performance, unbreakable flexibility and high utility. The hollow fiber carbon membrane comprises carbonized substance obtained by calcination of a hollow fiber-like material formed from a polyphenylene oxide derivative, and has an external diameter in the range of 0.08 mm to 0.25 mm. The polyphenylene oxide derivative substantially comprises repeating units represented by the following (a) and (b) (in the structural formula, $R^{11}$ and $R^{12}$ independently represent hydrogen atom or sulfone group, except that $R^{11}$ and $R^{12}$ are both hydrogen atoms), wherein the ratio A (%) of the repeating unit (b) to the repeating units (a)+(b) satisfies $15\% < A < 60\%$.

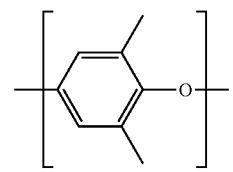

(a)

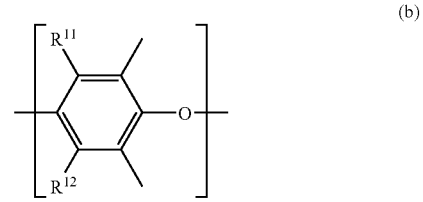

(b)

5 Claims, 1 Drawing Sheet

U.S. PATENT DOCUMENTS

| | | | |
|---|---|---|---|
| 6,683,783 B1 * | 1/2004 | Smalley et al. | 361/502 |
| 7,041,620 B2 * | 5/2006 | Smalley et al. | 502/182 |
| 7,575,707 B2 * | 8/2009 | Xia et al. | 264/465 |
| 2002/0150524 A1 * | 10/2002 | Smalley et al. | 422/198 |
| 2010/0130638 A1 * | 5/2010 | Hanaki et al. | 523/137 |
| 2010/0206164 A1 * | 8/2010 | Miyazawa et al. | 95/48 |

FOREIGN PATENT DOCUMENTS

| | | |
|---|---|---|
| JP | 05-220360 | 8/1993 |
| JP | 2006-231095 | 9/2006 |

* cited by examiner

HOLLOW FIBER CARBON MEMBRANE AND METHOD FOR PRODUCTION THEREOF

PRIORITY

This application has priority to JP 2007-201865 and PCT/JP2008/063731

BACKGROUND OF THE INVENTION

1. Field of the Invention

The present invention generally relates to a hollow fiber carbon membrane comprising a polyphenylene oxide derivative, and method for production thereof, in particular, to a hollow fiber carbon membrane comprising a polyphenylene oxide derivative which has excellent gas separation performance, improved brittleness and excellent unbreakable flexibility, and method for production thereof.

2. Description of Related Art

Carbon membranes have exhibited excellent gas separation performance in various inorganic membrane applications, and can also be used in the environments requiring heat resistance and chemical resistance where organic membranes are unable to be used, thus their practical applications have been highly expected. In addition, due to excellent pressure resistance and larger membrane area per unit volume, hollow fiber membranes can be made into more compact separation membrane modules, as compared to flat membranes or spiral membranes. However, in making the separation membrane modules, there are disadvantages such as poor brittleness, difficult to be sealed and high cost for the hollow fiber membranes made up of the carbon membranes.

To date, cellulose-based carbon membranes have been known as carbon membrane with excellent flexibility and bending strength, but this kind of carbon membrane has several problems, such as relatively more and complicated preparation steps (see patent reference 1). Additionally, it has been reported that an asymmetric hollow fiber membrane comprising an aromatic polyimide is partially carbonized to obtain a carbon membrane with excellent flexibility and bending strength, but this carbon membrane cannot satisfy the cost requirement, and the preparation of the polymer material is very complex (see patent reference 2).

The present inventor has filed a patent for a hollow fiber carbon membrane comprising an inexpensive polyphenylene oxide derivative, and a carbonized membrane for gas separation with excellent formability, gas separation performance and gas permeability has been obtained (see patent reference 3).

Patent reference 1: Japanese Patent No. 2914972.
Patent reference 2: Japanese Patent No. 2673846.
Patent reference 3: Japanese Patent Publication No. 2006-231095.

However, further researches by the present inventors have indicated that the hollow fiber carbon membrane obtained by utilizing the method described in the patent reference 3 has poor brittleness and is easily broken in various operations.

Therefore, there still remains a need in the art for a hollow fiber carbon membrane with excellent gas separation performance and high unbreakable flexibility which can be obtained from inexpensive materials by simple steps.

SUMMARY OF THE INVENTION

Accordingly, the present invention is directed to a hollow fiber carbon membrane with excellent gas separation performance, unbreakable high flexibility and high utility, and method for production thereof.

To solve the problems above, the present inventors have repeatedly carried out further researches on an inexpensive poly(2,6-dimethyl-1,4-phenylene oxide) derivative polymer (sometimes called as "PPO derivative" hereinafter), and the results have shown the fact that repeating units composing the PPO derivative and the external diameter of the hollow fiber carbon membrane would have a great effect on the flexibility and gas separation performance of the hollow fiber carbon membrane.

Based on the fact above, the present invention has found that, by using a PPO derivative containing repeating units with particular substituents in a predetermined amount, and setting the external diameter of the hollow fiber carbon membrane to a particular value, the hollow fiber carbon membrane with excellent gas separation selectivity, gas permeability and unbreakable flexibility can be produced successfully. In addition, the present inventor has also carried out further researches on production conditions such as carbonization temperature, thereby accomplishing the present invention.

That is, the present invention provides a hollow fiber carbon membrane, which comprises carbonized substance obtained by calcination of a hollow fiber-like material formed from a polyphenylene oxide derivative, and has an external diameter in the range of 0.08 mm to 0.25 mm, wherein the polyphenylene oxide derivative substantially comprises repeating units represented by the following structural formulae:

[structural formula 1]

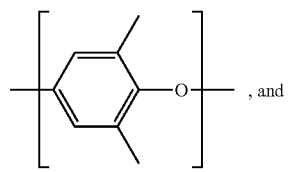

, and

[structural formula 2]

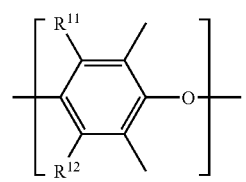

(in the structural formula, R11 and R12 independently represent hydrogen atom, —SO3H or —SO3NH4, except that R11 and R12 are both hydrogen atoms), wherein the ratio A (%) of the repeating unit (b) to the repeating units (a)+(b) satisfies 15%<A<60%.

In addition, the present invention provides a method for producing a hollow fiber carbon membrane, comprising: dissolving a polyphenylene oxide derivative in an organic solvent, the polyphenylene oxide derivative substantially comprising repeating units represented by the following structural formulae:

[structural formula 1]

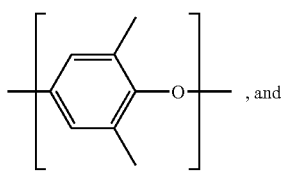

, and

[structural formula 2]

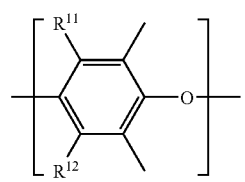

(in the structural formula, R11 and R12 independently represent hydrogen atom, —SO3H group or —SO3NH4 group, except that R11 and R12 are both hydrogen atoms), wherein the ratio A (%) of the repeating unit (b) to the repeating units (a)+(b) satisfies 15%<A<60%;

extruding the solution from an outer tube of a hollow fiber spinning nozzle with a circular cannula structure, the outer tube of which has an external diameter less than or equal to 0.5 mm and an internal diameter greater than or equal to 0.15 mm, while extruding an immiscible core liquid from the inner tube of the hollow fiber spinning nozzle, together into a coagulation bath, thereby forming a hollow fiber; and calcining the hollow fiber.

In addition, the method according to the present invention is characterized in that: the core liquid and coagulation bath comprise any one of water and aqueous ammonium salt.

Furthermore, in the method according to the present invention, it is preferable that the calcination is performed at a temperature in the range of 450° C. to 850° C., under a reduced pressure less than or equal to $10^{-4}$ atm or in an inert gas atmosphere, wherein the inert gas is selected from one of argon gas, helium gas and nitrogen gas.

Furthermore, in the method according to the present invention, it is preferable that before the calcination, a pre-heating treatment is performed at a temperature in the range of about 150° C. to 300° C. for 30 minutes to 4 hours. Additionally, after the calcination, a post-heating treatment can be optionally performed at a temperature in the range of 150° C. to 300° C. for 30 minutes to 4 hours, to improve the flexibility.

EFFECT OF THE PRESENT INVENTION

The hollow fiber carbon membrane according to the present invention has excellent gas permeability, gas separation performance and bending strength. By utilizing the method according to the present invention for producing a hollow fiber carbon membrane comprising a polyphenylene oxide derivative, a hollow fiber carbon membrane with unbreakable high flexibility and high utility can be produced from inexpensive materials by simple steps.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

ILLUSTRATION OF SYMBOLS a outer tube of the hollow fiber spinning nozzle
b inner tube of the hollow fiber spinning nozzle

DESCRIPTION OF THE EMBODIMENTS

The hollow fiber carbon membrane according to the present invention comprises a carbonized substance and has an external diameter in the range of 0.08 mm to 0.25 mm. The carbonized substance is prepared as follows: a polyphenylene oxide derivative substantially comprising repeating units represented by the structural formulae (a) and (b) where the ratio A (%) of the repeating unit (b) to the repeating units (a)+(b) satisfies 15%<A<60% is dissolved in an organic solvent, then the solution is extruded together with a core liquid to form a hollow fiber, which is dried and calcinated to form the carbonized substance. Further, the polyphenylene oxide derivative according to the present invention is sometimes termed as "sulfonylated PPO".

There is no particular limitation on the molecular weight of the polyphenylene oxide derivative as the raw material, provided that it is suitable for producing the carbonized membrane for gas separation. It is preferable that the weight average molecular weight is about 5,000-1,000,000.

The method for producing a hollow fiber carbon membrane using a polymer as the raw material is known in the art. However, the production method according to the present invention is characterized by the nozzle, core liquid and coagulation bath employed.

That is, the polyphenylene oxide derivative polymer is firstly dissolved in any solvent to prepare a stock solution for membrane production (called as precursor polymer solution). At this time, some materials for stabilizing the solution can be added previously in an amount within a range for the initial purpose. The solvents useful herein include methanol, ethanol, tetrahydrofuran, N,N-dimethyl acetamide, N-methyl-2-pyrrolidone, and the like, and mixtures thereof.

Figure 2:
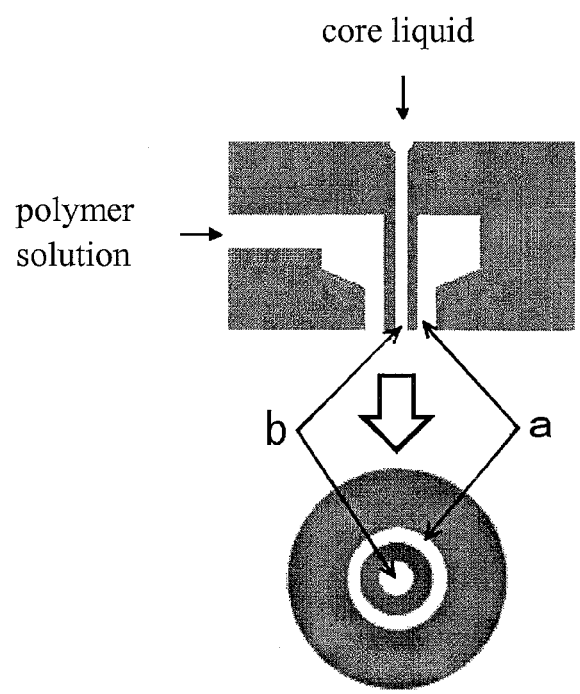
FIG. 2 is a schematic diagram of a hollow fiber spinning nozzle with a circular cannula structure used for producing the hollow fiber carbon membrane according to the present invention.

Next, the stock solution for membrane production is extruded into a coagulation bath from the outer tube a of a hollow fiber spinning nozzle with a circular cannula structure as shown in FIG. 2, while a core liquid which is mixed with the solvent in the stock solution but immiscible with the polyphenylene oxide derivative polymer is extruded from the inner tube b of the hollow fiber spinning nozzle, thereby forming a hollow fiber-like material. At this time, by appropriately adjusting the ratio of the diameter of the outer tube and the takeup rate of the hollow fiber spinning nozzle with the cannula structure, the hollow fiber carbon membrane obtained according to the present invention has a specified external diameter. Thus, the hollow fiber carbon membrane with an external diameter in the range of 0.08 mm to 0.25 mm can be obtained as follows: the stock solution for membrane production is extruded from the outer tube of the hollow fiber spinning nozzle, the outer tube of which has an external diameter less than or equal to 0.5 mm and an internal diameter greater than or equal to 0.15 mm, while an immiscible core liquid is extruded from the inner tube of the hollow fiber spinning nozzle, together into a coagulation bath to form a hollow fiber, which is then subjected to calcination.

The core liquid and coagulation bath used in the present invention is a solvent which is mixed with the solvent in the stock solution, but immiscible with the polyphenylene oxide derivative, preferably water or aqueous ammonium salt, such as, ammonium nitrate, ammonium hydrochloride, and ammonium sulphate. The temperature of the core liquid and coagulation bath is −20° C. to 60° C., preferably 0° C. to 30° C.

Furthermore, it has been shown that saturated brine used as the core liquid and coagulation bath in the patent reference 3 should be desalinated, and the physical property of the precursor polymer hollow fiber-like material may cause several problems during the carbonization step in the method using brine as the core liquid and coagulation bath. For example, in the carbonization, the precursor polymer hollow fiber-like material becomes thinner and thus more brittle, failing to obtain a hollow fiber carbon membrane like that of the present invention which is thin and flexible.

After the resulting hollow fiber-like material is dried, the precursor polymer membrane with various shapes can be obtained. Although the precursor polymer membrane may be subjected to carbonization directly, it is advantageous that the precursor polymer membrane is subjected to non-fusible treatment by heating at a temperature below the carbonization temperature (e.g. about 150° C. to 300° C.) for 30 minutes to 4 hours. Through the non-fusible treatment, the properties of the hollow fiber carbon membrane can be particularly improved.

The precursor polymer membrane or the precursor membrane through the non-fusible treatment may be subjected to carbonization by means of the methods well-known in the art, thereby producing the hollow fiber carbon membrane. For example, the precursor is placed in a container and heated under a reduced pressure less than or equal to $10^{-4}$ atm or in an inert gas atmosphere such as helium gas, argon gas, or nitrogen gas without reducing pressure to produce the hollow fiber carbon membrane.

The heating conditions can vary depending on the kind and amount of the materials composing the precursor. However, under a reduced pressure less than or equal to $10^{-4}$ atm or in an inert gas atmosphere, the precursor should be heated at 450° C. to 850° C. for 30 minutes to 4 hours.

Furthermore, it has been shown that in the present invention, in the event that after the calcination, a post-heating treatment is performed at a temperature in the range of 150° C. to 300° C. for 30 minutes to 4 hours, the flexibility of the hollow fiber carbon membrane can be improved while maintaining the performances thereof.

By utilizing the method according to the present invention, a hollow fiber carbon membrane with excellent flexibility and gas separation performance can be obtained from an inexpensive polyphenylene oxide derivative polymer. Moreover, because the hollow fiber carbon membrane according to the present invention has excellent module processability, a membrane module can be made by compactly filling the hollow fiber carbon membrane into a container, thereby manufacturing a gas separation device with small size and high efficiency.

The hollow fiber carbon membrane according to the present invention can be used, for example, as carbonized membrane well-known in the art, especially for gas separation. It is particularly useful in the fields, such as hydrogen gas production, carbon dioxide separation and recovery, spent gas separation and recovery, natural gas separation, gas dehumidification, alcohol dehydration, oxygen gas production from air.

EXAMPLES

The present invention will be described in detail by reference to examples below. However, the present invention is not limited to the following examples in any way.

Methods for evaluating hollow fiber carbon membranes obtained in the examples and comparative examples are as follows.

(Measurement of Membrane External Diameter)

Figure 1:
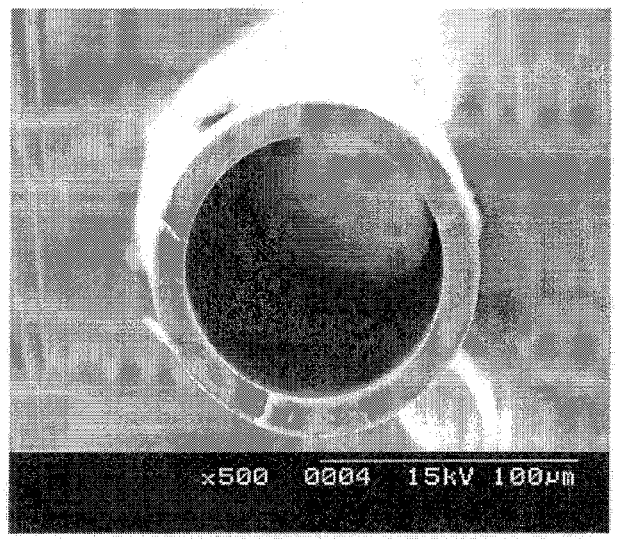
FIG. 1 is a SEM picture of the cross section of the hollow fiber carbon membrane obtained in example 1.

The cross sections of the hollow fiber carbon membranes obtained in examples 1-9 and comparative examples 1-7 were observed by utilizing a scanning electron microscope (SEM), and the membrane external diameters were calculated. FIG. 1 is a SEM picture of the cross section of the resulting hollow fiber carbon membrane.

The results and production conditions are shown in Table 1.

(Evaluation of Membrane Flexibility)

The hollow fiber carbon membranes obtained in examples 1-9 and comparative examples 1-7 were wound 180° or more on the columns with various diameters, and observed for the breakage. The column with the minimum radius on which the hollow fiber membrane is not broken was found out for evaluating the membrane flexibility, and the bending radius was represented by the column radius. The results are shown in Table 1.

(Evaluation of Gas Separation Performance of Hollow Fiber Carbon Membrane)

Test gases $H_2$, $CO_2$, $O_2$, $N_2$ and $CH_4$ were used for investigating the gas separation performance of the hollow fiber carbon membrane as follows.

A test gas was supplied under a certain pressure to the inner surface of a hollow fiber module installed on a device for determining the gas permeation rate of the hollow fiber, and the permeated gas flow was determined by a flow meter. At this time, the gas permeation velocity Q was calculated based on the following equation and used for evaluating the gas separation performance. In addition, the ideal separation coefficient α was calculated from the ratio of Q values of two test gases.

$$Q = \{\text{gas permeation flow } (cm^3 \cdot STP)\} / \{\text{membrane area } (cm^2) \times \text{time (sec)} \times \text{pressure difference (cmHg)}\}$$

The results are shown in Table 2.

Example 1

Preparation of Precursor Polymer Membrane 15.0 g of PPO was dissolved in 325 ml of chloroform, and a solution of 8.5 ml of chlorosulfuric acid dissolved in 85 ml of chloroform was added dropwise. The mixture was reacted at room temperature for 30 minutes, to give a sulfonylated PPO with A=45%.

(Preparation of Hollow Fiber Precursor Polymer Membrane)

4.0 g of the sulfonylated PPO was dissolved in 10.5 g of methanol, to prepare a stock solution for membrane production containing 27.5 wt % (weight percent) of polyphenylene oxide derivative polymer.

The resulting stock solution for membrane production and a 15 wt % of aqueous ammonium nitrate as the core liquid were extruded respectively from the outer tube of a hollow fiber spinning nozzle with a circular cannula structure, the outer tube of which has an external diameter of 0.4 mm and an internal diameter of 0.26 mm, and from the inner tube of the same nozzle, together into a water coagulation bath, and the resulting solution was dried in air at room temperature, to give a precursor polymer membrane.

(Pre-Heating Treatment of Hollow Fiber Carbon Membrane)

Next, in a muffle furnace, the resulting hollow fiber membrane was heated to 260° C. at 8° C./min in ambient environment. After heating for 1 hour at this temperature, the membrane was allowed to stand for cooling and the precursor polymer membrane was subjected to non-fusible treatment.

(Production of Hollow Fiber Carbon Membrane)

Subsequently, the hollow fiber carbon membrane intermediate obtained above was subjected to carbonization by using a vacuum electric furnace. At this point, the pressure in the vacuum electric furnace was reduced to less than or equal to $10^{-5}$ ton firstly, and then the temperature in the vacuum electric furnace was increased to 600° C. at 10° C./min. After heating for 2 hours at this temperature, the resulting membrane was allowed to stand for cooling, thereby obtaining a hollow fiber carbon membrane.

(Evaluation of Resulting Hollow Fiber Carbon Membrane)

The cross section of the hollow fiber carbon membrane obtained in example 1 is shown in FIG. 1. The membrane external diameter is shown in Table 1. Additionally, the evaluation results of the resulting hollow fiber membrane are shown in Table 2.

As known from Tables 1 and 2, the resulting hollow fiber carbon membrane has excellent gas permeability, gas separation performance and bending strength.

Example 2

Except that the calcination conditions were changed as follows: 550° C. and 2 hours, the hollow fiber carbon membrane was obtained in the same manner as that in example 1.

As known from Tables 1 and 2, the resulting hollow fiber carbon membrane has excellent gas permeability, gas separation performance and bending strength, which is the same as that in example 1.

Example 3

Except that the calcination conditions were changed as follows: 500° C. and 2 hours, the hollow fiber carbon membrane was obtained in the same manner as that in example 1.

As known from Tables 1 and 2, the resulting hollow fiber carbon membrane has excellent gas permeability, gas separation performance and bending strength, which is the same as that in example 1.

Example 4

Except that the calcination conditions were changed as follows: 600° C. and 1 hour, the hollow fiber carbon membrane was obtained in the same manner as that in example 1.

As known from Tables 1 and 2, the resulting hollow fiber carbon membrane has excellent gas permeability, gas separation performance and bending strength, which is the same as that in example 1.

Example 5

Except that the hollow fiber spinning nozzle with the circular cannula structure was replaced by a nozzle having an outer tube with an external diameter of 0.5 mm and an internal diameter of 0.35 mm, the hollow fiber carbon membrane was obtained in the same manner as that in example 1.

As known from Tables 1 and 2, the resulting hollow fiber carbon membrane has excellent gas permeability, gas separation performance and bending strength, which is the same as that in example 1.

Example 6

As post-treatment, the hollow fiber carbon membrane obtained in example 5 was heated at 10° C./min to 250° C. in ambient environment for 1 hour, to give a hollow fiber carbon membrane.

As known from Tables 1 and 2, there is no significant difference in gas permeability and gas separation performance between the resulting hollow fiber carbon membrane and that in example 5, but its bending strength is superior to that in example 5. As can be seen from the results, the post-treatment according to the present invention can effectively improve the flexibility of the hollow fiber carbon membrane.

Example 7

Preparation of Precursor Polymer Membrane 15.0 g of PPO was dissolved in 325 ml of chloroform, and a solution of 7 ml of chlorosulfuric acid dissolved in 78 ml of chloroform was added dropwise. Then, the mixture was reacted at room temperature for 30 minutes, to give a sulfonylated PPO with A=25%.

(Preparation of Hollow Fiber Precursor Polymer Membrane)

4.0 g of the sulfonylated PPO was dissolved in 10.5 g of methanol, to prepare a stock solution for membrane production containing 27.5 wt % of polyphenylene oxide derivative polymer.

The resulting stock solution for membrane production and ion exchanged water as the core liquid were extruded respectively from the outer tube of a hollow fiber spinning nozzle with a circular cannula structure, the outer tube of which has an external diameter of 0.4 mm and an internal diameter of 0.26 mm, and from the inner tube of the same nozzle, together into a water coagulation bath, and the resulting solution was dried in air at room temperature, to give a precursor polymer membrane.

(Pre-Heating Treatment of Hollow Fiber Carbon Membrane)

Next, in a muffle furnace, the resulting hollow fiber membrane was heated to 260° C. at 8° C./min in ambient environment. After heating for 1 hour at this temperature, the membrane was allowed to stand for cooling and the precursor polymer membrane was subjected to non-fusible treatment.

(Production of Hollow Fiber Carbon Membrane)

Subsequently, the hollow fiber carbon membrane intermediate obtained above was subjected to carbonization by using a vacuum electric furnace. At this point, the pressure in the vacuum electric furnace was reduced to less than or equal to $10^{-5}$ torr firstly, and then the temperature in the vacuum electric furnace was increased to 600° C. at 10° C./min. After heating for 2 hours at this temperature, the resulting membrane was allowed to stand for cooling, thereby obtaining a hollow fiber carbon membrane.

(Evaluation of Resulting Hollow Fiber Carbon Membrane)

The external diameter of the hollow fiber carbon membrane obtained in example 7 is shown in Table 1. Additionally, the evaluation results of the resulting hollow fiber membrane are shown in Table 2.

As known from Tables 1 and 2, the resulting hollow fiber carbon membrane has excellent gas permeability, gas separation performance and bending strength.

Example 8

Except that the calcination conditions were changed as follows: 550° C. and 2 hours, the hollow fiber carbon membrane was obtained in the same manner as that in example 7.

As known from Tables 1 and 2, the resulting hollow fiber carbon membrane has excellent gas permeability, gas separation performance and bending strength, which is the same as that in example 7.

Example 9

Except that the calcination conditions were changed as follows: 500° C. and 2 hours, the hollow fiber carbon membrane was obtained in the same manner as that in example 7.

As known from Tables 1 and 2, the resulting hollow fiber carbon membrane has excellent gas permeability, gas separation performance and bending strength, which is the same as that in example 7.

Comparative Example 1

Preparation of Hollow Fiber Precursor Polymer Membrane 3.0 g of PPO with A=0% was dissolved in 9.0 g of chloroform, to prepare a stock solution for membrane production containing 25 wt % of polyphenylene oxide polymer.

The resulting stock solution for membrane production and ethanol as the core liquid were extruded respectively from the outer tube of a hollow fiber spinning nozzle with a circular cannula structure, the outer tube of which has an external diameter of 0.4 mm and an internal diameter of 0.26 mm, and from the inner tube of the same nozzle, together into an ethanol coagulation bath, and the resulting solution was dried in air at room temperature, to give a precursor polymer membrane.

(Pre-Heating Treatment of Hollow Fiber Carbon Membrane)

Next, in a muffle furnace, the resulting hollow fiber membrane was heated to 280° C. at 8° C./min in ambient environment. After heating for 1 hour at this temperature, the membrane was allowed to stand for cooling and the precursor polymer membrane was subjected to non-fusible treatment.

(Production of Hollow Fiber Carbon Membrane)

Subsequently, the hollow fiber carbon membrane intermediate obtained above was subjected to carbonization by using a vacuum electric furnace. At this point, the pressure in the vacuum electric furnace was reduced to less than or equal to $10^{-5}$ ton firstly, and then the temperature in the vacuum electric furnace was increased to 600° C. at 10° C./min. After heating for 2 hour at this temperature, the resulting membrane was allowed to stand for cooling, thereby obtaining a hollow fiber carbon membrane.

(Evaluation of Resulting Hollow Fiber Carbon Membrane)

The external diameter of the hollow fiber carbon membrane obtained in comparative example 1 is shown in Table 1. Additionally, the evaluation results of the resulting hollow fiber membrane are shown in Table 2.

As known from Table 1, the hollow fiber carbon membrane produced by using PPO with A=0% as the raw material has insufficient flexibility.

Comparative Example 2

Preparation of Precursor Polymer Membrane)

15.0 g of PPO was dissolved in 325 ml of chloroform, and a solution of 12 ml of chlorosulfuric acid in 78 ml of chloroform was added dropwise. The mixture was reacted at room temperature for 30 min, to give a sulfonylated PPO with A=60%.

(Preparation of Hollow Fiber Precursor Polymer Membrane)

3.0 g of the sulfonylated PPO was dissolved in 10.3 g of N,N-dimethyl acetamide, to prepare a stock solution for membrane production containing 22.5 wt % of polyphenylene oxide derivative polymer.

The resulting stock solution for membrane production and a 15 wt % of aqueous ammonium nitrate as the core liquid were extruded respectively from the outer tube of a hollow fiber spinning nozzle with a circular cannula structure, the outer tube of which has an external diameter of 0.4 mm and an internal diameter of 0.26 mm, and from the inner tube of the same nozzle, together into a water coagulation bath. However, in this comparative example using the sulfonylated PPO with A=60% as the raw material, the polymer solution did not coagulate in the water, so the hollow fiber membrane was unable to be obtained.

Comparative Example 3

Except that the hollow fiber spinning nozzle with the circular cannula structure was replaced by a nozzle having an outer tube with an external diameter of 1.0 mm and an internal diameter of 0.7 mm, the hollow fiber carbon membrane was obtained in the same manner as that in example 1. The external diameter of the hollow fiber carbon membrane obtained in comparative example 3 is shown in Table 1. Additionally, the evaluation results of the resulting hollow fiber membrane are shown in Table 2.

As known from Table 1, when the diameters of the nozzle are beyond the specified ranges, the resulting hollow fiber carbon membrane has insufficient bending strength.

Comparative Example 4

Except that the calcination conditions were changed as follows: 850° C. and 2 hours, the hollow fiber carbon membrane was obtained in the same manner as that in example 1. The external diameter of the hollow fiber carbon membrane obtained in comparative example 4 is shown in Table 1. Additionally, the evaluation results of the resulting hollow fiber membrane are shown in Table 2.

As known from Table 1, if the calcination temperature is too high, the resulting hollow fiber carbon membrane has insufficient bending strength.

Comparative Example 5

Except that the calcination conditions were changed as follows: 450° C. and 2 hours, the hollow fiber carbon membrane was obtained in the same manner as that in example 1. The external diameter of the hollow fiber carbon membrane obtained in comparative example 5 is shown in Table 1. Additionally, the evaluation results of the resulting hollow fiber membrane are shown in Table 2.

As known from Table 2, if the calcination temperature is too low, the resulting hollow fiber carbon membrane has insufficient gas separation performance.

Comparative Example 6

Except that the solution used as the core liquid and coagulation bath was replaced by a 20 wt % aqueous sodium chloride, the hollow fiber carbon membrane was obtained in the same manner as that in example 1.

As known from Table 2, if the aqueous sodium chloride is used as the core liquid and coagulation bath, the resulting hollow fiber carbon membrane has insufficient gas separation performance.

Comparative Example 7

Preparation of Precursor Polymer Membrane 5.0 g of PPO was dissolved in 250 ml of tetrahydrofuran, and 27.6 ml of a solution containing n-butyllithium hexane in 1.6 mol/l was added. After stirring at room temperature for 1 hour, 4.6 g of chlorotrimethylsilane was added dropwise. The mixture was reacted at room temperature for 10 minutes, to give a trimethylsilylated PPO with A=99%.

(Preparation of Hollow Fiber Precursor Polymer Membrane)

3.0 g of the trimethylsilylated PPO was dissolved in 12.0 g of chloroform, to prepare a stock solution for membrane production containing 27.5 wt % of polyphenylene oxide derivative polymer.

The resulting stock solution for membrane production and ethanol as the core liquid were extruded respectively from the outer tube of a hollow fiber spinning nozzle with a circular cannula structure, the outer tube of which has an external diameter of 0.4 mm and an internal diameter of 0.26 mm, and from the inner tube of the same nozzle, together into an ethanol coagulation bath, and the resulting solution was dried in air at room temperature, to give a precursor polymer membrane.

(Pre-Heating Treatment of Hollow Fiber Carbon Membrane)

Next, in a muffle furnace, the resulting hollow fiber membrane was heated to 280° C. at 8° C./min in ambient environment. After heating for 1 hour at this temperature, the membrane was allowed to stand for cooling and the precursor polymer membrane was subjected to non-fusible treatment.

(Production of Hollow Fiber Carbon Membrane)

Subsequently, the hollow fiber carbon membrane intermediate obtained above was subjected to carbonization by using a vacuum electric furnace. At this point, the pressure in the vacuum electric furnace was reduced to less than or equal to $10^{-5}$ ton firstly, and then the temperature in the vacuum electric furnace was increased to 600° C. at 10° C./min. After heating for 2 hours at this temperature, the resulting membrane was allowed to stand for cooling, thereby obtaining a hollow fiber carbon membrane.

(Evaluation of Resulting Hollow Fiber Carbon Membrane)

The external diameter of the hollow fiber carbon membrane obtained in comparative example 7 is shown in Table 1. Additionally, the evaluation results of the resulting hollow fiber membrane are shown in Table 2.

As known from Table 1, the resulting hollow fiber carbon membrane has insufficient bending strength.

TABLE 1

| | A (%) | External Diameter of Outer Tube of Nozzle (mm) | Pre-treatment | Carbonization Temperature (° C.) | Carbonization Time (h) | Post-treatment | Membrane External Diameter (μm) | Bending Radius (mm) |
|---|---|---|---|---|---|---|---|---|
| Example 1 | 45 | 0.4 | 260° C., 1 h | 600 | 2 | — | 129 | 3.0 |
| Example 2 | 45 | 0.4 | 260° C., 1 h | 550 | 2 | — | 132 | 2.6 |
| Example 3 | 45 | 0.4 | 260° C., 1 h | 500 | 2 | — | 135 | 2.4 |
| Example 4 | 45 | 0.4 | 260° C., 1 h | 600 | 1 | — | 134 | 2.8 |
| Example 5 | 45 | 0.5 | 260° C., 1 h | 550 | 1 | — | 232 | 4.3 |
| Example 6 | 45 | 0.5 | 260° C., 1 h | 550 | 1 | 250° C., 1 h | 232 | 3.9 |
| Example 7 | 25 | 0.4 | 260° C., 1 h | 600 | 2 | — | 153 | 4.6 |
| Example 8 | 25 | 0.4 | 260° C., 1 h | 550 | 2 | — | 155 | 3.7 |
| Example 9 | 25 | 0.4 | 260° C., 1 h | 500 | 2 | — | 163 | 3.0 |
| Comparative example 1 | 0 | 0.4 | 280° C., 1 h | 600 | 2 | — | 132 | 12.7 |
| Comparative example 2 | 60 | 0.4 | — | — | — | — | — | — |
| Comparative example 3 | 45 | 1.0 | 280° C., 1 h | 600 | 2 | — | 386 | 22.4 |
| Comparative example 4 | 45 | 0.4 | 260° C., 1 h | 850 | 2 | — | 121 | 10.1 |
| Comparative example 5 | 45 | 0.4 | 260° C., 1 h | 450 | 2 | — | 140 | 2.2 |
| Comparative example 6 | 45 | 0.4 | 260° C., 1 h | 600 | 2 | — | 132 | 8.1 |
| Comparative example 7 | 99 | 0.4 | 280° C., 1 h | 600 | 2 | — | 224 | 25.1 |

TABLE 2

| | Permeation Velocity Q ($10^{-6} \cdot cm^3(STP)/cm^2 \cdot s \cdot cmHg$) | | | | | Separation Coefficient α | | | | |
|---|---|---|---|---|---|---|---|---|---|---|
| | $H_2$ | $CO_2$ | $O_2$ | $N_2$ | $CH_4$ | $H_2/N_2$ | $CO_2/N_2$ | $O_2/N_2$ | $H_2/CH_4$ | $CO_2/CH_4$ |
| Example 1 | 167 | 50.3 | 12 | 1.2 | 0.4 | 141 | 43 | 10.6 | 392 | 118 |
| Example 2 | 137 | 48.7 | 12 | 1.2 | 0.5 | 110 | 39 | 9.6 | 278 | 99 |
| Example 3 | 57 | 27.6 | 6 | 0.7 | 0.3 | 79 | 38 | 8.1 | 170 | 83 |
| Example 4 | 105 | 21.5 | 5 | 0.6 | 0.3 | 176 | 36 | 8.4 | 393 | 80 |
| Example 5 | 77 | 35.6 | 8 | 1.0 | 0.6 | 80 | 37 | 8.4 | 139 | 64 |
| Example 6 | 98 | 34.9 | 8 | 1.1 | 0.8 | 86 | 30 | 6.7 | 119 | 42 |
| Example 7 | 160 | 32.6 | 8 | 0.6 | 0.3 | 267 | 54 | 13.0 | 557 | 113 |
| Example 8 | 98 | 19.9 | 5 | 0.4 | 0.2 | 227 | 46 | 10.9 | 551 | 112 |
| Example 9 | 71 | 9.7 | 3 | 0.4 | 0.3 | 196 | 27 | 8.6 | 273 | 37 |
| Comparative example 1 | 74 | 11.9 | 3.0 | 0.3 | 0.1 | 282 | 45 | 11.4 | 790 | 127 |
| Comparative example 2 | — | — | — | — | — | — | — | — | — | — |
| Comparative example 3 | 80 | 10.1 | 3 | 0.2 | 0.1 | 382 | 48 | 14.3 | 1048 | 131 |
| Comparative example 4 | 9.1 | 0.32 | 0.11 | 0.006 | 0.004 | 1453 | 51 | 17.1 | 2449 | 86 |
| Comparative example 5 | 20 | 15.5 | 3 | 0.7 | 0.7 | 31 | 24 | 4.5 | 29 | 22 |
| Comparative example 6 | 7.6 | 0.40 | 0.15 | 0.013 | 0.005 | 577 | 30 | 11.7 | 1561 | 82 |
| Comparative example 7 | 82 | 13.8 | 4 | 0.3 | 0.1 | 263 | 44 | 11.7 | 959 | 161 |

In Table 2 above, the unit is $10^{-6}$ cm$^3$(STP)/cm$^2 \cdot$ sec $\cdot$ cmHg. The temperature for determination is 30° C.

(—) means the data is not available.

INDUSTRIAL APPLICABILITY

The hollow fiber carbon membrane obtained by the method according to the present invention can be used to separate a variety of gases, including steam, especially hydrogen gas, steam, carbon dioxide, oxygen gas, nitrogen gas, methane, etc. Therefore, the hollow fiber carbon membrane according to the present invention has a great application value in industry.

What is claimed is:

1. A hollow fiber carbon membrane, comprising carbonized substance obtained by calcination of a hollow fibrous material formed from a polyphenylene oxide derivative, which has an external diameter in the range of 0.08 mm to 0.25 mm, wherein the polyphenylene oxide derivative substantially comprises repeating units represented by the following structural formulae:

[structural formula 1]

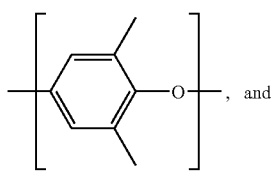
, and (a)

[structural formula 2]

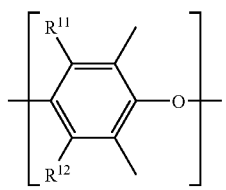

(b)

(in the structural formula, $R^{11}$ and $R^{12}$ independently represent hydrogen atom, —$SO_3H$ or —$SO_3NH_4$, provide that $R^{11}$ and $R^{12}$ are not simultaneously hydrogen atoms), wherein the ratio A (%) of the number of the repeating unit (b) to the number of the repeating unit (a)+the number of the repeating unit (b) satisfies 15%<A<60%, wherein the hollow fibrous material is formed by dissolving the polyphenylene oxide derivative in an organic solvent and extruding the solution from an outer tube of a hollow fiber spinning nozzle with a circular cannula structure while extruding an immiscible core liquid from the inner tube of the hollow fiber spinning nozzle, together into a coagulation bath, and the core liquid and coagulation bath comprise any one of water and aqueous ammonium salt.

2. A method for producing a hollow fiber carbon membrane, comprising dissolving a polyphenylene oxide derivative in an organic solvent, the polyphenylene oxide derivative substantially comprising repeating units represented by the following structural formulae:

[structural formula 1]

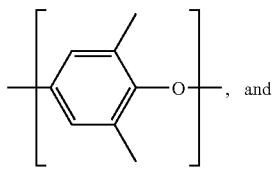
, and (a)

[structural formula 2]

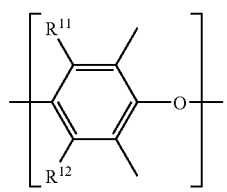

(b)

(in the structural formula, $R^{11}$ and $R^{12}$ independently represent hydrogen atom, —$SO_3H$ group or —$SO_3NH_4$ group, provide that $R^{11}$ and $R^{12}$ are not simultaneously hydrogen atoms), wherein the ratio A (%) of the number of the repeating unit (b) to the number of the repeating units (a)+the number of the repeating unit (b) satisfies 15%<A<60%;

extruding the solution from an outer tube of a hollow fiber spinning nozzle with a circular cannula structure, the outer tube of which has an external diameter less than or equal to 0.5 mm and an internal diameter greater than or equal to 0.15 mm, while extruding an immiscible core liquid from the inner tube of the hollow fiber spinning nozzle, together into a coagulation bath, thereby forming a hollow fiber; and calcining the hollow fiber, wherein the core liquid and coagulation bath comprise any one of water and aqueous ammonium salt.

3. The method for producing a hollow fiber carbon membrane according to claim 2, wherein the calcination is performed at a temperature in the range of 450° C. to 850° C. under a reduced pressure less than or equal to $10^{-4}$ atm, or performed at a temperature in the range of 450° C. to 850° C. in an inert gas atmosphere.

4. The method for producing a hollow fiber carbon membrane according to claim 2, wherein before the calcination, a pre-heating treatment is performed at a temperature in the range of 150° C. to 300° C. for 30 minutes to 4 hours.

5. The method for producing a hollow fiber carbon membrane according to claim 2, wherein after the calcination, a post-heating treatment is performed at a temperature in the range of 150° C. to 300° C. for 30 minutes to 4 hours.

* * * * *